United States Patent [19]

Basso et al.

[11] Patent Number: 5,673,263

[45] Date of Patent: Sep. 30, 1997

[54] METHOD FOR USING AN IP ADDRESS-BASED ROUTING PROTOCOL IN AN ATM ENVIRONMENT

[75] Inventors: Claude Basso, Nice; Philippe Damon, La Gaude; Jean-Bernard Schmitt, Nice, all of France

[73] Assignee: International Business Machines Corporation, Armonk, N.Y.

[21] Appl. No.: 548,029

[22] Filed: Oct. 25, 1995

[30] Foreign Application Priority Data

Mar. 31, 1995 [EP]  European Pat. Off. ............ 95480037

[51] Int. Cl.⁶ .................... H04L 12/46; H04L 12/56
[52] U.S. Cl. ................... 370/396; 370/400; 370/466
[58] Field of Search ................. 395/200.01, 200.15,
395/200.2, 311, 312, 500; 370/395, 396,
397, 400, 401, 466, 469, 471, 474

[56] References Cited

U.S. PATENT DOCUMENTS

| 5,425,026 | 6/1995 | Mori ................................ 370/60 |
| 5,440,547 | 8/1995 | Esaki et al. ......................... 370/60 |
| 5,453,980 | 9/1995 | Van Engelshoven ................. 370/60.1 |
| 5,491,693 | 2/1996 | Britton et al. ..................... 370/85.13 |
| 5,544,162 | 8/1996 | Mraz et al. ......................... 370/60 |

OTHER PUBLICATIONS

European Search Report.
IEEE Communications Magazine, vol. 32, No. 3, Mar. 1994 pp. 86–98.
EFOC 93, Jun. 1993, pp. 44–49.
Connexions Journal, vol. 8, No. 11, Nov. 1994 p. 2–13.
IEEE ICC 94, vol. 3, May 1994 pp. 1326–1330.

*Primary Examiner*—Alpus H. Hsu
*Attorney, Agent, or Firm*—John B. Frisone; Gerald R. Woods

[57] ABSTRACT

A technique for permitting continued use of IP (Internet Protocol) routing protocols in an Asynchronous Transfer Mode (ATM) network is implemented in each ATM system having route-computing responsibilities. When a call setup request is received, the routing system determines, from the ATM address of the target system, whether a routing protocol must be implemented. If a routing protocol must be implemented, data in an ACN (ATM Cluster Number) field and an HN (Host Number) field in the target ATM address is read and is imported into an IP-format address. This IP-format address is used in implementing the IP routing protocol.

1 Claim, 5 Drawing Sheets

METHOD FOR USING AN IP ADDRESS-BASED ROUTING PROTOCOL IN AN ATM ENVIRONMENT

FILED OF THE INVENTION

The present invention relates to data communications in general, and more particularly to a method for using an IP address-based routing protocol in an ATM (Asynchronous Transfer Mode) network environment.

BACKGROUND OF THE INVENTION

Asynchronous Transfer Mode or ATM switching technology is widely viewed as the base for future global communications. It has been adopted as a standard for broadband communications by the International Telecommunications Union (ITU) and by a communications industry consortium, the ATM Forum. The following publications deal extensively with basic ATM concepts and techniques:

- J. Y. Le Boudec, "The Asynchronous Transfer Mode: A tutorial", Comp Networks ISDN, 24, pp. 279–309, May 15, 1992,
- The ATM Forum, "UNI Specification", Version 3.0, Prentice Hall, ISBN 0-13-225863-3, September 1993, and Version 3.1, September 1994,
- The ATM Forum, "Interim Inter-Switch Signalling Protocol (IISP)", Draft 94-0924R2, November 1994,
- The ATM Forum, "P-NNI Draft Specification", Draft 94-0471R3, 1994.

A simplified example of an ATM network is given FIG. 1. An ATM network includes a set of end systems or terminal devices connected to the remainder of the network throught a User-to-Network Interface (UNI) and a set of intermediate nodes (ATM switches) interconnected through communications links. The interface between adjacent ATM switches is referred to either as a Switch-to-Switch Interface (SSI) for switches defined as being within the same ATM Cluster or as a Network-to-Network Interface (NNI) for switches in different ATM Clusters. In order to determine a path to a given end system, a routing method and system must be implemented for the ATM network. The clustering of ATM switches is discussed below.

Once a particular muting method or protocol has been defined and developed, it is desirable to continue using that protocol. A number of existing routing protocols make use of the Internet Protocol (IP) addressing scheme. An example of such a routing protocol frequently used in router environment is the Open Shortest Path First (OSPF) protocol. The following publications deal with OSPF and routing in an ATM network:

- RFC 1247, OSPF Version 2, J. Moy, July 1991, An OSPF-Based Routing Algorithm for SMDS Networks, M. E. Sosa, M. A. Figueroa, Globecom '92, p. 1057 ff.,
- Routing Metric for Connections with Reserved Bandwidth, J. Y. Le Boudec, R. Sultan and B. Przygienda, EFOC-N, June 1994, Heidelberg.

OSPF, like other routing protocols, is based on the use of IP addressing, which is not related to conventional ATM addressing, at least in a straightforward way.

The ATM Forum UNI specifications referenced above specify an interface that allows end systems attached to an ATM switch to establish and tear down ATM connections. These specifications cover, in particular, the following aspects that are relevant to the scope of the invention:

1) An ATM addressing scheme which describes the way to uniquely identify an end system (or more precisely a Subnetwork point of attachment);
2) A Signalling stack which describes the protocols used to set up and tear down connections;
3) Layer 2: SAAL (Signalling AM Adaptation Layer);
4) Layer 3: Based on ITU Signalling protocol Q.2931; and
5) The ILMI (Interim Local Management Interface) protocol, a key feature of which is an address registration mechanism that allows both the Network systems (ATM switches) and end systems to learn the complete ATM address associated with the interface.

The ATM Forum UNI Specifications identified above describe the address to be used by end systems. The end system address is formatted as an OSI Network Service Access Point (NSAP) address as specified by the published ISO 8348 and CCITT X.213 standards. The ATM address depends both on the end system and on the network node to which it is connected.

Every end system is associated with a unique End System Identifier (ESI), which is six bytes long, and a one byte Selector (for use within the end system). The ESI and Selector fields, taken together, form the end system part of an address.

Every network system or node is allocated a network part of 13 bytes, usually used by the routing protocols to locate and find a path to a target. At initialization, a network node communicates, via ILMI, the value of its network part to each attached end system. Each end system communicates its ESI portion to the network node. As a result of the initialization phase, both the network node and the end system know the end system address. If an end system moves from one network node to another, then its ATM address changes.

An IP address is different from an ATM address. An IP address is a four byte address composed of 2 parts. The first part is a Network/Subnetwork part identifying the subnetwork to which the system belongs. This first part is used by routing protocols to make routing decisions. The second part is a Host part identifying an end system on a Subnetwork. The second part is ignored by the routing protocols.

To provide the referenced UNI interface to attached end systems in an ATM network in accordance with the above-referenced specifications, two basic functions need to be implemented in the network. The first function is connection control which is responsible for reserving resources along the connection path. The second function is route selection, which is responsible for finding the best route between the source and the target end systems.

Even within ATM networks. It can make sense technically and economically to continue to use proven IP routing protocols. The challenge is the addressing issue. ATM addressing is based on a twenty byte address whereas IP routing protocols are designed to deal with 4 byte addresses.

The classical solution to such a challenge would be to implement a Directory Services function in the network. Such a function could be modeled on client/server principles. Each client (each switch) would register address pairs (ATM address, IP address) with the Directory Server, allowing the server to build a Directory Data Base. A client would have to issue a resolve request to the Directory Server to map an ATM address to an IP address.

Such a classic solution has weak points. First, because the Directory Server is an additional function which must be provided inside the network, it adds to the costs of implementing the network. Second, if the Directory Server fails, the network itself will also fail since address mapping will no longer be possible. Third, the use of a Directory Server imposes a performance penalty since the address resolution procedure adds to the connection setup time.

SUMMARY OF THE INVENTION

The present invention is a method of mapping ATM addresses into IP addresses, enabling the continued use of IP based routing protocols, such as OSPF or RIP, for ATM calls through an ATM network without incurring the disadvantages of the known prior art. The IP addresses resulting from the mapping operation are referred as 'internal' IP addresses. The objective of the method is to automatically generate IP addresses, completely hiding the IP addressing scheme used by the routing protocols from the ATM end systems. A two-level hierarchy is defined by reserving two fields in the ATM addresses used in the system. The first field identifies an ATM cluster while the second field identifies a particular ATM hub within that cluster. These two fields are mapped or transferred into IP addresses to maintain compatibility with IP address-based routing protocols.

BRIEF DESCRIPTION OF THE DRAWINGS

While the technical description concludes with claims that particularly point out and distinctly claim that which is regarded as the present invention, details of a preferred embodiment of the invention may be more readily ascertained from the following technical description when read in conjunction with the below-described drawings.

The invention provides automatic and local mapping between the network part of an ATM address and the Subnetwork part of an IP address used by an IP routing protocol. The term 'local' means that the mapping is done without any interactions with remote switches or servers. This internal use of IP addresses for ATM call routing is completely independent of the address, whether IP or not, used by the end systems connected to the switch.

Figure 1:
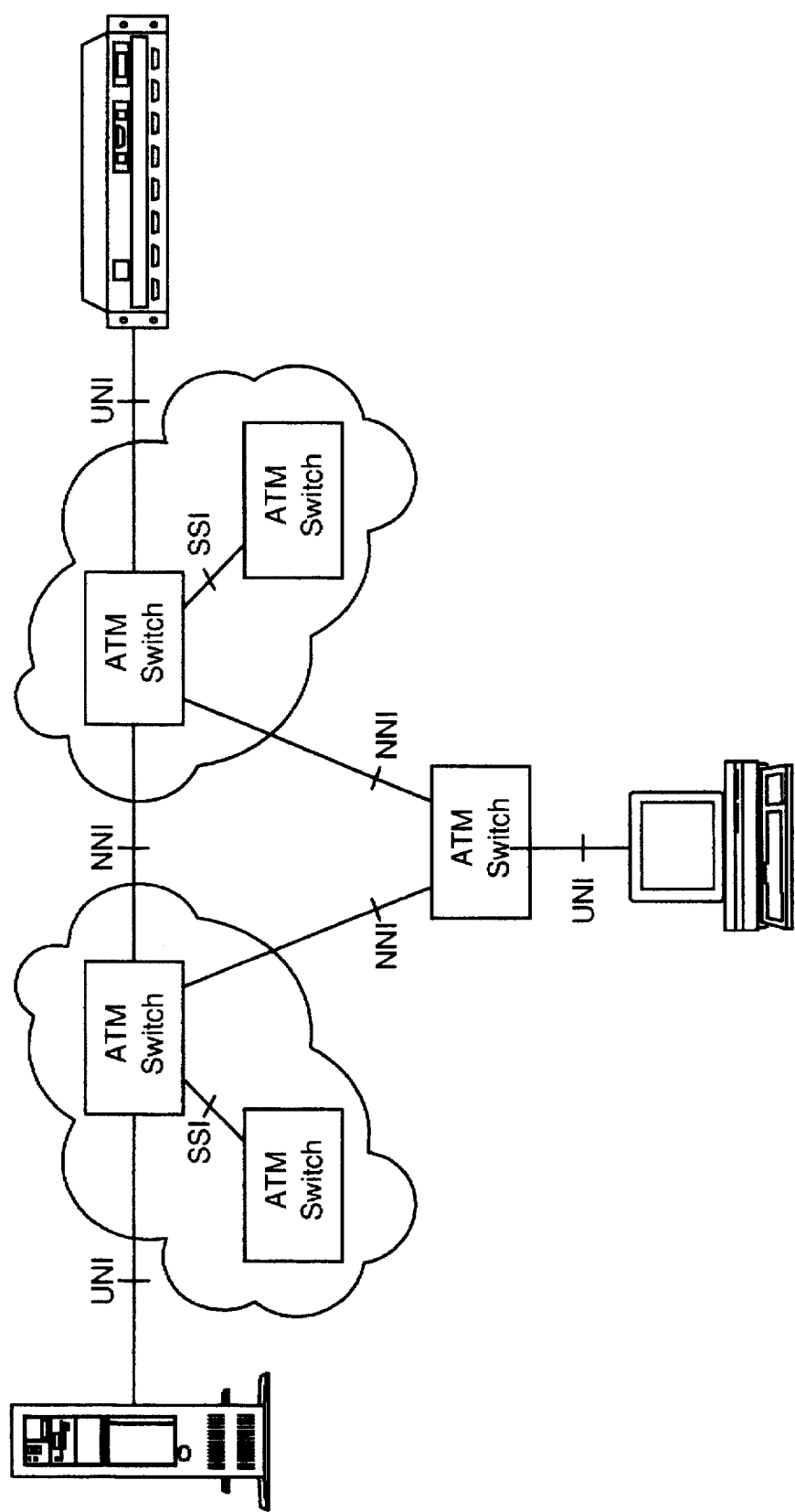
FIG. 1 is a simplified example of an ATM network.
Figure 2:
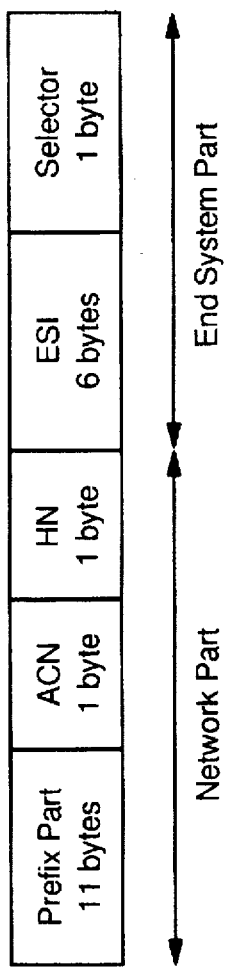
FIG. 2 is a representation of an ATM address including fields written in accordance with the present invention.

Referring to FIG. 2, which depicts an ATM address, the two rightmost bytes of the Network part of the address are used to construct a two level network hierarchy. The first level of the hierarchy is a one byte ATM Cluster Number (ACN) identifying an ATM cluster. The second level of the hierarchy is a one byte Hub Number (HN) identifying a hub within an ATM cluster. The remaining eleven bytes of the Network part of the ATM address are a Prefix Part which identifies a particular ATM addressing Subnetwork.

Figure 6:
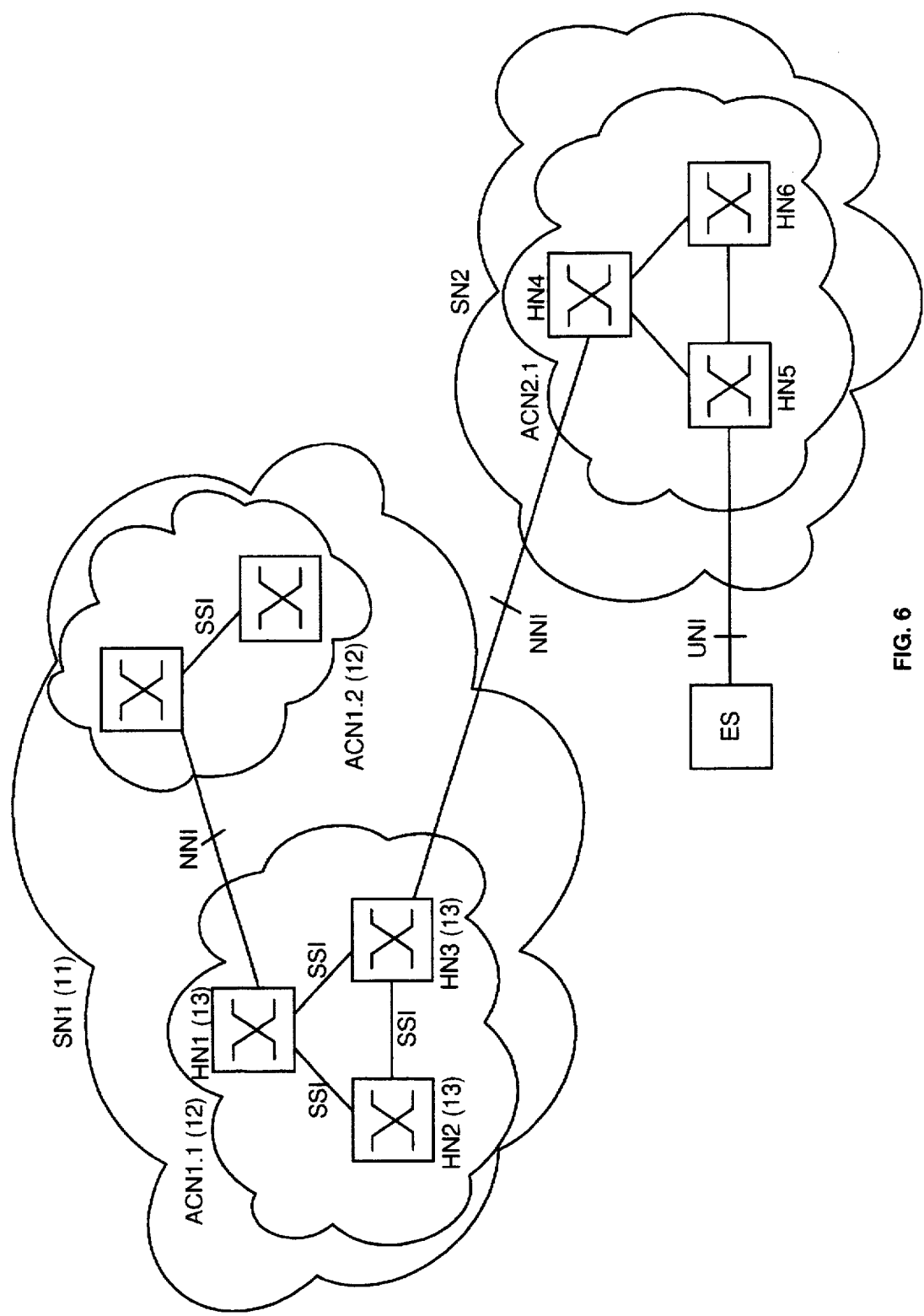
FIG. 6 is a representation of a hierarchy in an ATM network.

The two level hierarchy is illustrated in FIG. 6 which shows a network including two Subnetworks SN1 and SN2. The ATM address for every piece of equipment within the same Subnetwork has all 11 byte Prefix Part in its ATM address. Each Subnetwork consists of clusters of all ATM switches with all switches in a cluster having the same ACN byte (and eleven byte Prefix Part) in their ATM addresses. From a routing standpoint an ATM cluster is seen as a set of switches interconnected by a set of point-to-point links. As noted earlier, the interface between switches in the same ATM cluster is referred to as a Switch to Switch interface (SSI).

To perform routing decisions, the OSPF (Open Shortest Path First) routing algorithm requires the each switch at an end point of a point-to-point link be identified by a unique IP address. The IP address associated with each switch represents the switch itself as well as the set of end systems attached to the switch. This address is called the 'Switch internal IP address'.

Upon reception of a 'Call Setup' message, the switch extracts the ATM address of the target end system from the 'called party number' information. If the thirteen bytes of the target ATM address match the thirteen bytes of the switch ATM address, the call is local; i.e., the called end system is attached to the same switch as the caller and no route computation is required.

If only the first eleven bytes of the target ATM address match the eleven bytes of the switch ATM address, the called end system is attached to another switch, either inside or outside the ATM Cluster, as indicated by whether the ACN field in the two addresses also match or not. In the latter case, the OSPF routing algorithm must establish a route to the target switch. To do so, the 'Switch internal IP address' is computed from the called Party number as follows. The IP Subnet mask is set to 0xFFFFFFFC; i.e., the Subnetwork part is 30 bits and the Host part 2 bits.

The first byte is set to a dummy value 51 to make sure that the IP internal addressing used for ATM call routing does not interfere with end system IP addressing scheme. The second byte 52 is set to the value of the ACN number (which is byte 12 of the ATM address). The third byte 53 is set to the value of the HN number (Byte 13 of the ATM address). The remaining six bits 54 of the Subnetwork part of the address are set to zero.

Figure 3:
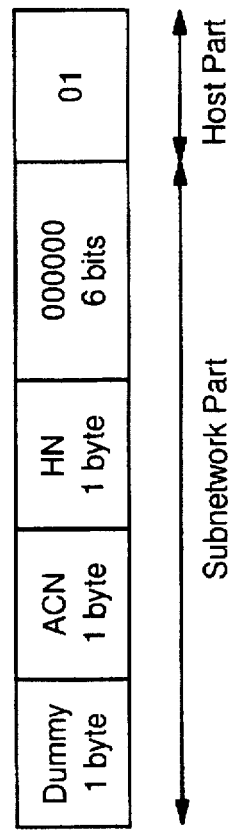
FIG. 3 is a representation of a computed IP address resulting from the mapping process of the present invention.

This computed IP address, as shown in FIG. 3, identifies the switch at which the called end system resides. A route to the called end system can be requested by providing this IP address to the routing service.

If the eleven bytes of the target ATM address do not match the eleven bytes of the switch address, the called end system does not belong to the same addressing domain, and other techniques, not part of the present invention, are used.

Besides the address identifying each switch, the OSPF routing algorithm requires one unique IP address per end of each SSI interface. In the router environment, the common solution is to rely on the network operator to define these addresses. The obvious drawback is that this process is manual and is therefore burdensome and not secure as there is a risk of duplicate addresses being inadvertently assigned in the network. Automatic address computation is provided to hide IP internal addressing from the network operator and to provide an error-free way of defining the point-to-point link IP addresses.

Figure 4:
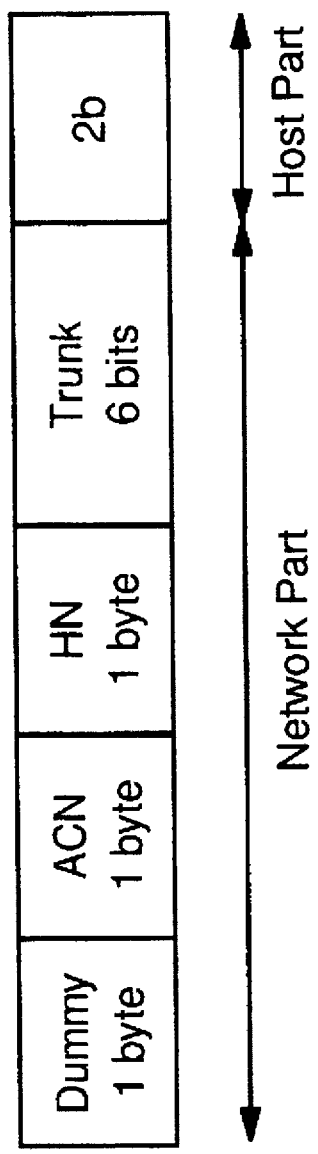
FIG. 4 is a representation of a computed IP address generated according to the present invention for point-to-point links.

When considering an IP address for a point-to-point link, the following applies. IP addressing requires that the two ends of each point-to-point link share the same Subnetwork part of IP address, i.e. the IP address for each end of the link can differ only by the Host part. FIG. 4 shows the general format of an internal IP address for an end of a point-to-point link. The address format includes a one byte Dummy field, the one byte ACN (ATM Cluster Number) field, the one byte HN (Host Number) field, a six bit Trunk identifier field and a two bit Host identifier field. To differentiate between the thirty bits which comprise the Network part of the address and the two bits which comprise the Host part, an IP Subnet mask field is set to 0xFFFFFFFC.

Figure 5:
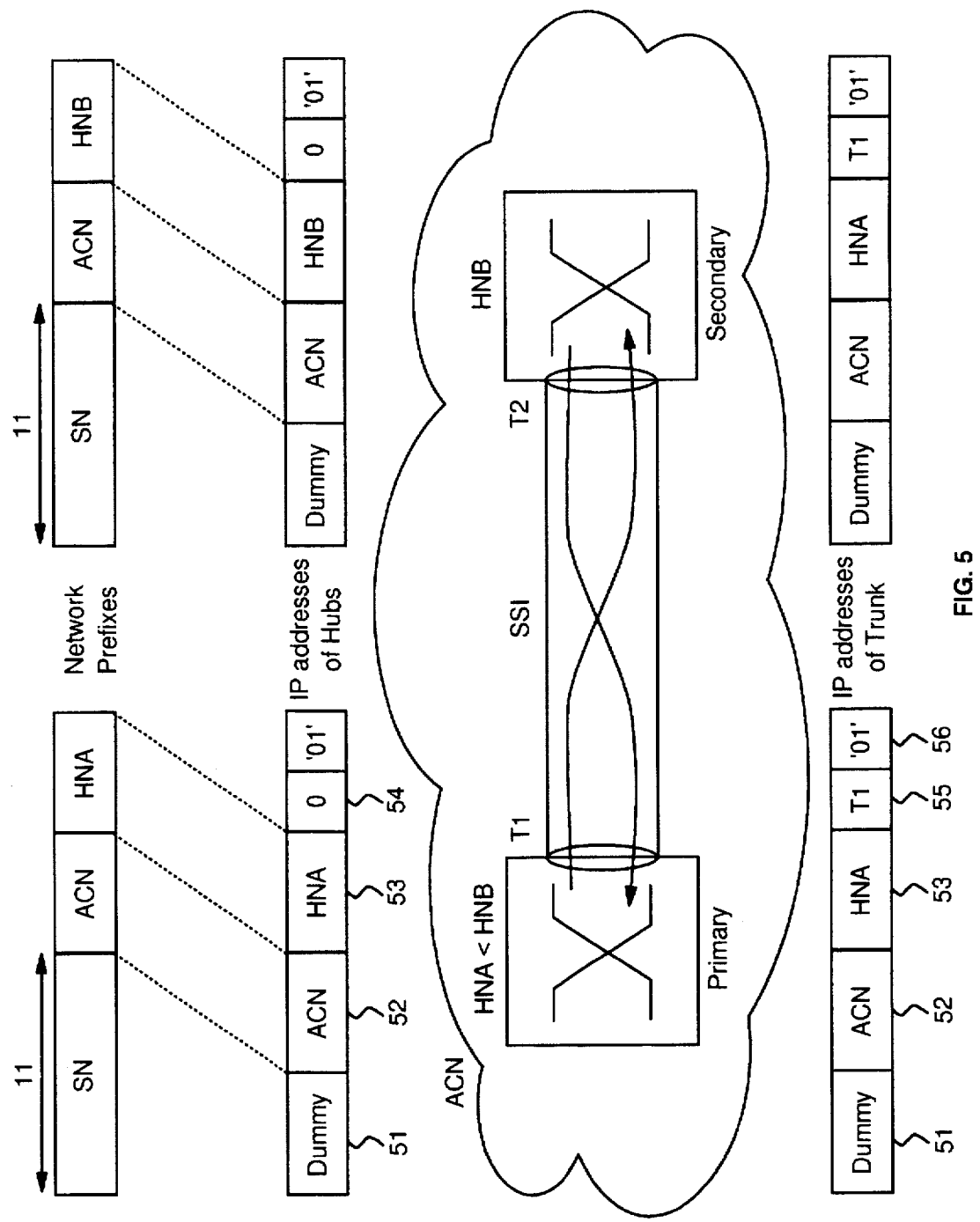
FIG. 5 is a representation of mapping of ATM addresses into IP addresses.

Further detail about this IP address format is provided with reference to FIG. 5. The first byte 51 of an IP address is set to a dummy value which ensures that the IP internal addressing used for ATM call routing does not interfere with end system IP addressing scheme. The second byte 52 is set to the value of the ACN number, which is byte 12 of the ATM address. The ACN number is necessarily the same for both ends of a SSI link since, by definition, an SSI link is internal to an ATM cluster. The third byte 53 is set to the value of the HN number of the Primary switch. The Primary switch is defined as the switch that assigns the HN value. In the Figure, different HN values are represented as HNA, HNB, etc.

The six remaining (Trunk) bits 55 of the Network part of the address are defined by the Primary switch which assigns a different IP address to each trunk or point-to-point link originating from the Primary switch. With six bits available in the Trunk field, sixty-four different links can be given unique Trunk identifiers T1, T2, etc.

The two bit Host part field 56 in an IP address is set to '01' to designate the Primary switch and to '10' to designate the Secondary switch. Thus, for systems at opposite ends of a link, the IP addresses are substantially identical, differing only by the two bit Host part field.

As explained below, the automatic generation of IP addresses for both ends of a point-to-point link is based on the fact that a switch at one end is designated the Primary switch, establishing the HN value, the Trunk value and the Host value fields of the IP addresses not only for the Primary switch but also for the Secondary switch at the other end of the SSI link.

The selection of a particular system as the Primary switch is accomplished using a simple protocol at the time of link initialization. Adjacent switches exchange their Hub Number (HN) field values. The switch with the lowest HN value becomes the Primary switch while the switch with the higher value becomes the Secondary switch.

While there has been described what is considered to be a preferred embodiment of the present invention, variations and modifications in that embodiment will occur to those skilled in the art once they learn of the basic inventive concepts. Therefore, it is intended that the appended claims shall be construed to include both the preferred embodiment and all such variations and modifications as fall within the true spirit and scope of the invention.

What is claimed is:

1. A method of implementing IP (Internet Protocol) routing protocols in an Asynchronous Transfer Mode (ATM) network comprising a plurality of individual systems, wherein each individual system has a unique network address including a network part and an end system part, each of said parts including a plurality of fields, said method being implemented at one of said plurality of individual systems located within the ATM network and having route computing capabilities and comprising the steps of:

a) receiving a request that a call be established to a target system identified by a target ATM network address supplied with said request;

b) analyzing the network part of the said target ATM network address to determine whether a routing protocol must be implemented in establishing a path to the target system;

c) in those instances where a routing protocol must be implemented, selecting system-identifying data from selected fields of the network part of the target network ATM address (into) and incorporating them in an IP-format network address for accessing the target system; and, d) implementing a selected IP routing protocol using the created IP-format network address for the target system;

wherein the selected fields in the target ATM network address comprises an ACN field identifying a cluster of ATM systems and an HN field identifying a particular system within the identified cluster.

* * * * *